(12) United States Patent
Grossman et al.

(10) Patent No.: US 9,430,739 B2
(45) Date of Patent: Aug. 30, 2016

(54) DETERMINING GENERAL CAUSATION FROM PROCESSING SCIENTIFIC ARTICLES

(71) Applicant: PRAEDICAT, INC., Culver City, CA (US)

(72) Inventors: Adam Grossman, Culver City, CA (US); Lauren Caston, Culver City, CA (US); Ryan Irvine, Culver City, CA (US); David Loughran, Culver City, CA (US); Robert Thomas Reville, Culver City, CA (US)

(73) Assignee: Praedicat, Inc., Los Angeles, CA (US)

( * ) Notice: Subject to any disclaimer, the term of this patent is extended or adjusted under 35 U.S.C. 154(b) by 260 days.

(21) Appl. No.: 14/135,436

(22) Filed: Dec. 19, 2013

(65) Prior Publication Data

US 2015/0178628 A1 Jun. 25, 2015

(51) Int. Cl.
*G06N 5/04* (2006.01)

(52) U.S. Cl.
CPC ..................... *G06N 5/04* (2013.01)

(58) Field of Classification Search
None
See application file for complete search history.

(56) References Cited

U.S. PATENT DOCUMENTS

| 6,873,914 | B2 * | 3/2005 | Winfield | G01N 30/8655 702/19 |
| 2014/0006332 | A1 * | 1/2014 | Abercrombie | G06N 5/02 706/46 |
| 2014/0114987 | A1 * | 4/2014 | Hoeng | G06N 5/02 707/748 |

* cited by examiner

*Primary Examiner* — Alan Chen
(74) *Attorney, Agent, or Firm* — Stephen C. Jones

(57) ABSTRACT

Examples of the disclosure are directed toward generating a causation score with respect to an agent and an outcome, and projecting a future causation score distribution. For example, a causation score may be determined with respect to a hypothesis that a given agent causes a given outcome, and the score may indicate the acceptance of that hypothesis in the scientific community, as described by scientific literature. A future causation score distribution, then, may indicate a probability distribution over possible future causation scores, thereby predicting the scientific acceptance of the hypothesis at some specific date in the future. A future causation score distribution can be projected by first generating one or more future publication datasets, and then determining causation scores for each of the one or more future publication datasets.

24 Claims, 8 Drawing Sheets

DETERMINING GENERAL CAUSATION FROM PROCESSING SCIENTIFIC ARTICLES

FIELD OF THE DISCLOSURE

This relates generally to methods of determining causation of an outcome by an agent.

SUMMARY

Examples of the disclosure are directed toward generating a causation score with respect to an agent and an outcome, and projecting a future causation score distribution. For example, a causation score may be determined with respect to a hypothesis that a given agent causes a given outcome, and the score may indicate the acceptance of that hypothesis in the scientific community, as described by scientific literature. A future causation score distribution, then, may indicate a probability distribution over possible future causation scores, thereby predicting the scientific acceptance of the hypothesis at some specific date in the future. An agent may include any hypothesized cause of an outcome, including a chemical, a material, a process, a business practice, and/or a behavior, among numerous other possibilities.

In some examples, a causation score may be determined based on a corpus of scientific publications, such as a database of articles and/or abstracts, or metadata corresponding to individual scientific publications. For example, each abstract or article may be annotated with metadata, and the causation score may be determined based on some or all of the set of metadata across the corpus. A future causation score distribution can be projected by first generating one or more future publication datasets, and then determining causation scores for each of the one or more future publication datasets.

DETAILED DESCRIPTION

Figure 1A:
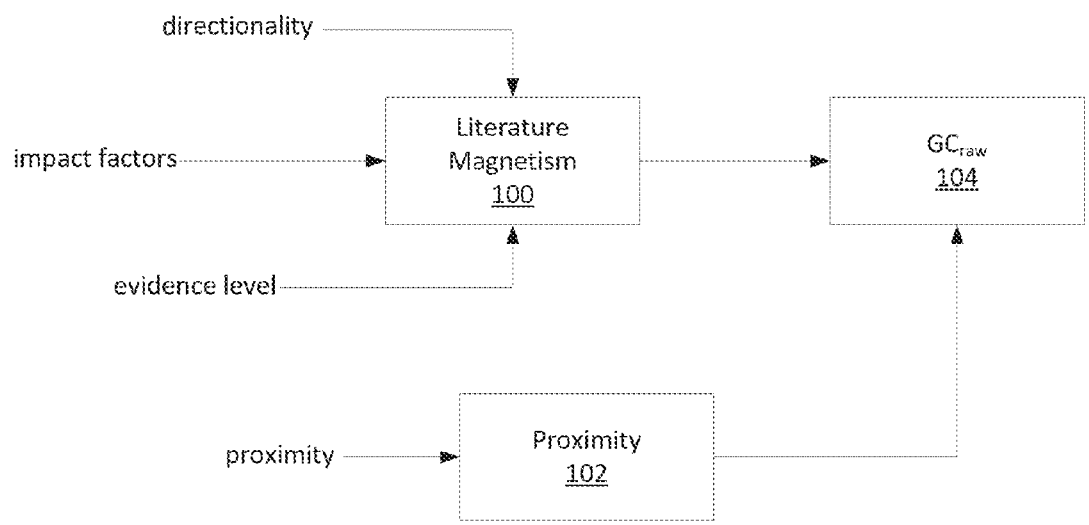
FIGS. 1A and 1B illustrate an exemplary method of determining a causation score according to examples of the disclosure.

In the following description of embodiments, reference is made to the accompanying drawings which form a part hereof, and in which it is shown by way of illustration specific embodiments which can be practiced. It is to be understood that other embodiments can be used and structural changes can be made without departing from the scope of the disclosed embodiments.

Examples of the disclosure are directed toward generating a causation score with respect to an agent and an outcome, and projecting a future causation score distribution. For example, a causation score may be determined with respect to a hypothesis that a given agent causes a given outcome, and the score may indicate the acceptance of that hypothesis in the scientific community, as described by scientific literature. A future causation score distribution, then, may indicate a probability distribution over possible future causation scores, thereby predicting the scientific acceptance of the hypothesis at some specific date in the future. An agent may include any hypothesized cause of an outcome, including a chemical, a material, a process, a business practice, and/or a behavior, among numerous other possibilities.

In some examples, a causation score may be determined based on a corpus of scientific publications, such as a database of articles and/or abstracts, or metadata corresponding to individual scientific publications. For example, each abstract or article may be annotated with metadata, and the causation score may be determined based on some or all of the set of metadata across the corpus. A future causation score distribution can be projected by first generating one or more future publication datasets, and then determining causation scores for each of the one or more future publication datasets.

Although examples of the disclosure may be discussed with reference to determining scientific acceptance of a causation hypothesis, the methods disclosed are not so limited and may apply to determining a causation score in general. Additionally, although examples may be described with reference to biomedical science literature, the examples are not so limited and may apply to natural science literature in general. Further, the equations provided herein are merely examples to illustrate the calculation of various scores, but the examples are not so limited and alternative and additional formulations are contemplated.

As discussed above, a causation score may be determined based on metadata of an annotated corpus of scientific publications. The annotations may be associated with a particular agent and a particular outcome. For example, a corpus of scientific publications may be annotated with respect to the agent bisphenol A (BPA) and the outcome breast cancer, and the metadata would be associated with that agent/outcome pair. Such metadata can include directionality data, evidence data, proximity data, and/or magnitude data, among other possibilities.

Directionality data can indicate whether an article supports or rejects a hypothesis that the agent causes the outcome. For example, a 1 can indicate that the article supports the hypothesis, a −1 can indicate that the article rejects the hypothesis, and a 0 can indicate that the article is uncertain on the hypothesis.

Evidence data can indicate the evidence level of an article, that is, how well the methodology of the article can demonstrate a causal relationship. For example, a randomized, controlled trial can demonstrate a causal relationship well. Such an article may have a higher value than an uncontrolled observational study, which may not demonstrate a causal relationship as well. Evidence level may be annotated based on a plurality of categories of study design, and each category may be associated with a value on the interval [0,1], reflective of the category's relative importance in informing the causal hypothesis for a specified agent and outcome.

Proximity data can indicate whether the evidence provided in the article is direct evidence or indirect evidence that an agent causes an outcome in a target population. In some examples, this may include a measure of how close the model used in the article is to the target population. For example, if the target population is humans, the hypothesis of interest is whether the agent causes the outcome in humans. In such a case, an animal study would have a lower proximity value than a human study, because the humans in the study are more similar biologically to the target population and thus human evidence is more direct than animal evidence. In some examples, proximity data may comprise a simple categorization of each study as either human, animal, or in vitro; in some examples, the proximity data may comprise a simple categorization of each study as either indirect evidence or direct evidence. The proximity data may only include articles/abstracts that are relevant to the causal hypothesis for the specified agent and outcome.

Magnitude data can quantify the strength of the association between an agent and an outcome as observed in an article or abstract. For example, magnitude data can include odds ratios, statistical significance, risk ratios, and/or standardized mortality ratios, among other possibilities.

The causation score may be further determined based on data that is not specific to an agent/outcome pair. For example, the causation score may be determined based on the quality of the journals in which the relevant literature was published. This can be determined on the basis of the journal, the author(s) of the article, the lab which conducted the study described in the article, and/or the corporation that funded the study, among other possibilities. Literature impact data (also referred to as impact factors) can be calculated, or in some examples literature impact data may be obtained from a database of such information.

Figure 1B:
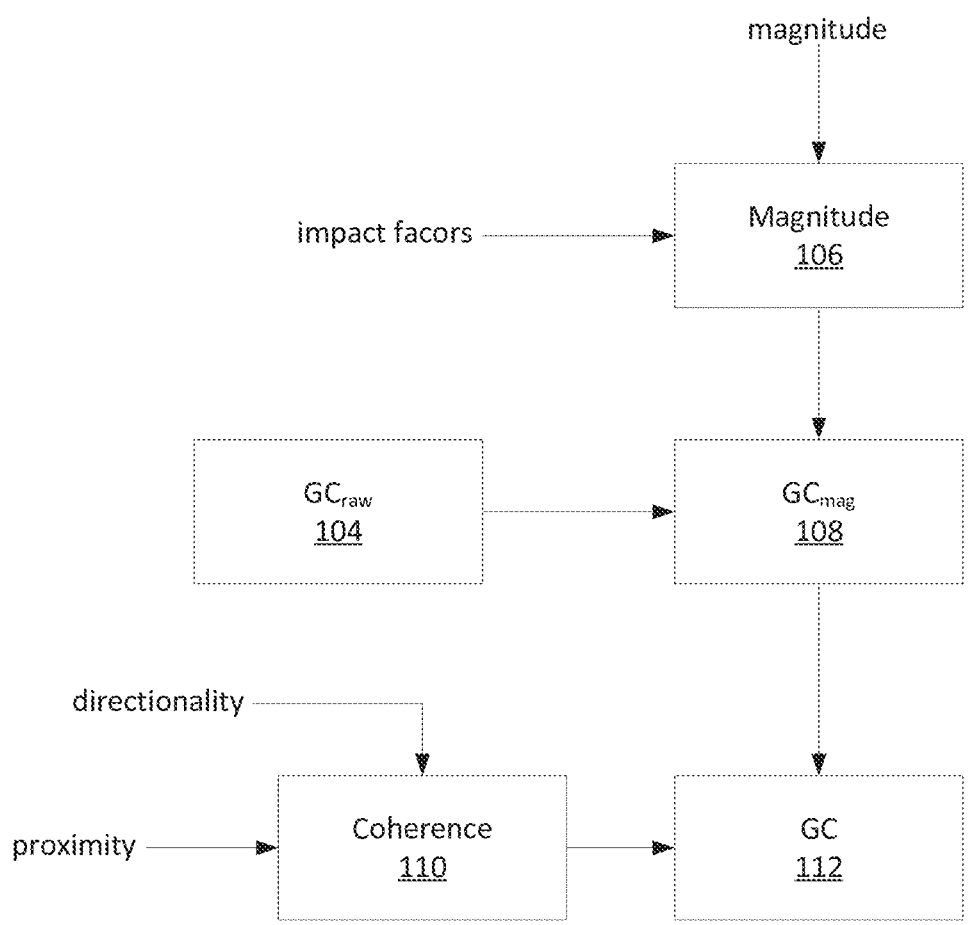

FIGS. 1A and 1B illustrate an exemplary method of determining a causation score according to examples of the disclosure. A literature magnetism score (100) may be calculated based on directionality data, evidence data, and/or impact factors, among other possibilities. A literature magnetism score may indicate an aggregate "direction" of the relevant scientific literature with respect to causation for a given agent/outcome hypothesis. In some examples, the literature magnetism score may be calculated based on the following equation:

$$LM_{raw} = \Sigma_i \sqrt{IF_i} \cdot EL_i \cdot d_i \quad (1)$$

where, for each article or abstract i, IF may be its journal impact factor, EL may be its evidence level, and d may be its directionality. $LM_{raw}$ may be unbounded, with positive scores reflecting overall support for causation and negative scores reflecting a lack of support. The magnetism score may be constrained to the interval $[-1,1]$ using a scaled sigmoidal squashing function, such as hyperbolic tangent. In some examples, the following equation may be used:

$$LM = \tanh(\alpha LM_{raw}) \quad (2)$$

The constant $\alpha$ may be a tuning parameter used to set the active range of the magnetism score, that is, over what range of scores will adding more publications continue to affect the final score. In some examples, $\alpha$ may be equal to 0.2. Interpreting $d_i$ as a two-state choice parameter, a modeling analogy can be drawn to mean field theory and the mean field energy of scientific consensus can be calculated. The effect of this analogy is to apply a hyperbolic tangent function to the raw literature magnetism score as illustrated in equation 2. Although examples are described with respect to a literature magnetism score, a magnetism score may take into account other evidence supporting or rejecting a causation hypothesis and, in fact, may be based on no scientific literature in some examples. In some examples, a magnetism score may be further based on one or more other data sets, such as magnitude data.

A proximity score (102) may be determined based on at least proximity data. The proximity score can indicate the directness of the aggregate evidence in the scientific literature, as discussed above. In some examples, the proximity score may be calculated based on the following equation:

$$P = \frac{1}{1 + e^{-\beta(x-0.5)}}, \quad (3)$$

$$\text{where } x = \frac{\text{human} + \text{animal}/2}{\text{human} + \text{animal} + \text{in vitro}/4}$$

The variables human, animal, and in vitro may indicate the total number of articles/abstracts categorized in the proximity data as human, animal, and in vitro, respectively. The constant $\beta$ may establish the steepness of a transition zone and the width of a "flat" area of P when x is near 0 or 1. In some examples, $\beta$ may be equal to 15. In this example, a literature composed entirely of human studies would receive a proximity score of 1.0; whereas one with all animal studies would receive a score of 0.5, and literatures absent human studies would be bounded at 0.5 or below. In some examples, a proximity score may be calculated based on categories other than human, animal, and in vitro—for example, a proximity score may be calculated based on direct evidence and indirect evidence categories, or the like.

A raw causation score $GC_{raw}$ (104) may be calculated based on the magnetism score and the proximity score. In some examples, the raw causation score may be calculated as the simple product of the magnetism score and the proximity score. In some examples, the raw causation score may be calculated as the product $LM^a \cdot P^b$, where a and b are constant parameters. In some examples, the raw causation score may be an intermediate result further modified as described with respect to FIG. 1B. However, in other examples, the raw causation score may be determined to be the causation score for the agent/outcome hypothesis and accepted as a final result.

In FIG. 1B, a magnitude score (106) may be computed based on magnitude data and literature impact data. The magnitude score may indicate aggregate effect size, conditional on study quality and statistical significance. In some examples, the magnitude score may be calculated based on the following equation:

$$M = \tanh\left(\frac{x-2}{\sqrt{2}}\right), \quad (4)$$

$$\text{where } x = \frac{\sum_i \sqrt{IF_i \cdot b_i} \cdot OR_i}{\sum_i \sqrt{IF_i \cdot b_i}}$$

where, for each article or abstract i, IF may be its journal impact factor, OR may be its odds ratio, and b may indicate statistical significance of the odds ratio (for example, $b_i$ may be equal to 1 if the $OR_i$ is statistically significant or 0.25 if non-significant).

A causation score $GC_{mag}$ (108) may be calculated based on a raw causation score $GC_{raw}$ (104) moderated by the calculated magnitude score M (106). For example, $GC_{mag}$ may be calculated according to the following conditions:

For positive $GC_{raw}$/positive M, $$GC_{mag} = GC_{raw} + M(1 - GC_{raw}) \quad (5)$$

For positive $GC_{raw}$/negative M, $$GC_{mag}=GC_{raw}(1-+M) \quad (6)$$

For negative $GC_{raw}$/positive M, $$GC_{mag}=GC_{raw}(1-M) \quad (7)$$

For negative $GC_{raw}$/negative M, $$GC_{mag}=GC_{raw}+M(1+GC_{raw}) \quad (8)$$

Finally, a coherence score may be computed based on directionality data and/or proximity data, among other possibilities. For example, count data may be tabulated to obtain, for each proximity category, the number of positive studies and the number of negative studies (in some examples, additional categories of directionality may be used). Then, test statistics (e.g., chi-squared) may be calculated based on the count data to determine whether the ratio of positive to negative studies is statistically different across the proximity categories. The test may yield a chi-squared statistic corresponding to a p-value, and the coherence score may be calculated by the following equation, among other possibilities:

$$C=\tanh(kp+\tan^{-1} m) \quad (9)$$

where p may be the p-value calculated as described above, and k and m may be parameters determining the steepness of the function and its offset. The coherence score may then be combined with the magnitude-adjusted causation score $GC_{mag}$ to compute a causation score GC (112). For example, the magnitude-adjusted causation score may be weighted by the coherence score, although other combinations are possible.

Figure 2:
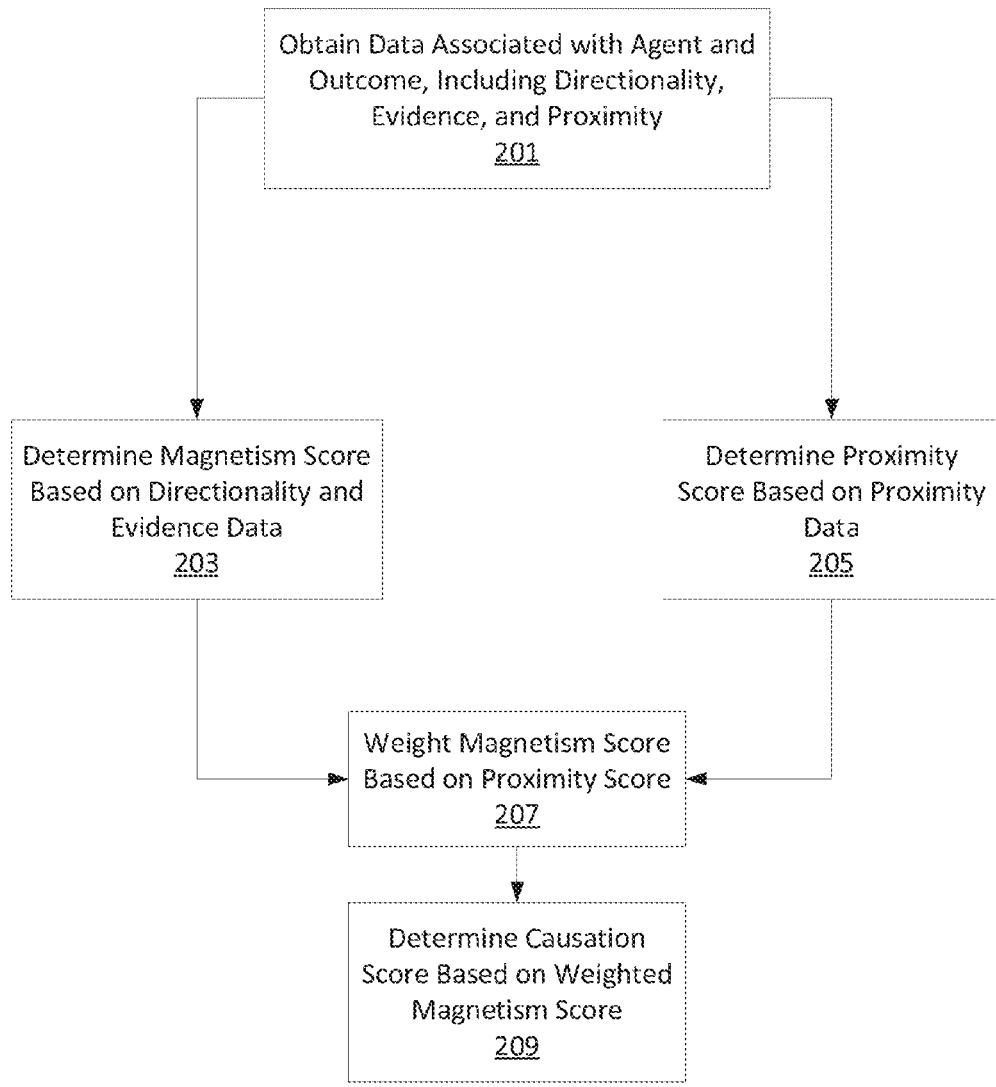
FIG. 2 illustrates an exemplary method of determining a causation score according to examples of the disclosure.

FIG. 2 illustrates an exemplary method of determining a causation score associated with an agent and an outcome, according to examples of the disclosure. Data associated with an agent and an outcome may be obtained, the data including directionality data, evidence data, and proximity data (201). As discussed above, such data may be stored as metadata associated with a plurality of articles and/or abstracts. A magnetism score (e.g., literature magnetism score) may be determined based on directionality data and evidence data (203). A magnetism score may be a literature magnetism score, and the score may be calculated based on directionality data, evidence data, and/or literature impact data (e.g., impact factors), among other possibilities, as shown in equations 1 and 2. A proximity score may be determined based on proximity data (205), as shown in one example in equation 3. The magnetism score may be weighted based on the proximity score (207), and the causation score may be based on the weighted magnetism score (209). For example, the weighted magnetism score may be taken as the causation score. In some examples, the weighted magnetism may be further combined with magnitude data, a magnitude score, and/or a coherence score, among other possibilities, in order to determine the causation score.

Figure 3:
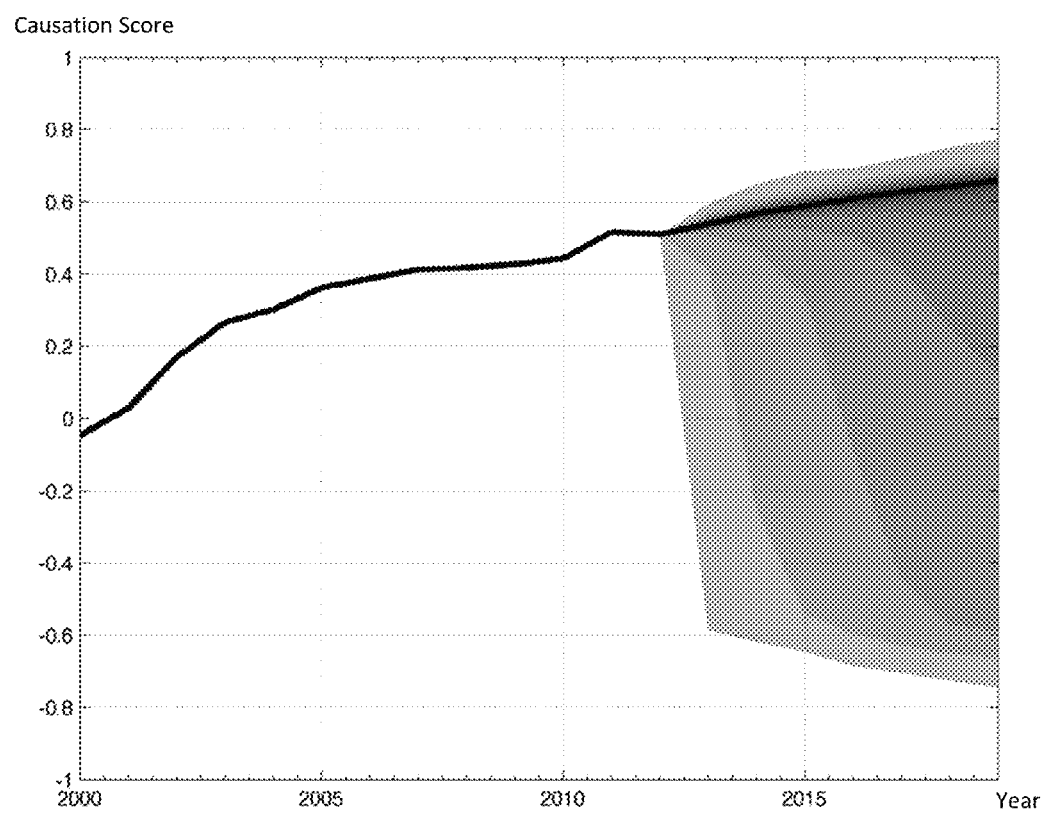
FIG. 3 illustrates an exemplary projected causation score distribution according to examples of the disclosure.
Figure 4:
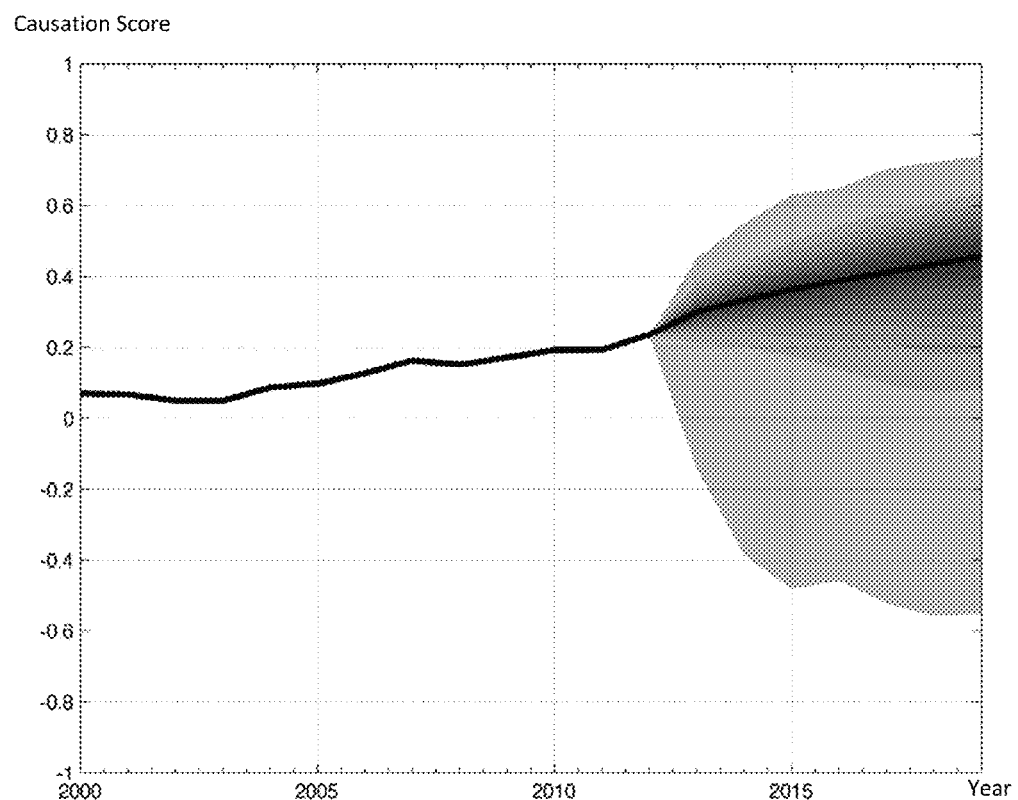
FIG. 4 illustrates another exemplary projected causation score distribution according to examples of the disclosure.

Each of FIGS. 3 and 4 illustrate an exemplary projected causation score distribution according to examples of the disclosure. The line in each graph illustrates a determined causation score as a function of time, including both causation scores for years passed and projected causation scores for years in the future. The levels of shading around the line in each graph illustrate the projected causation score distribution, with each level representing deviation from the median of the distribution. FIGS. 1A, 1B, and 2 and accompanying text describe methods of computing causation scores for the present and the past, and methods of projecting future causation score distributions are described with respect to FIG. 5.

Figure 5:
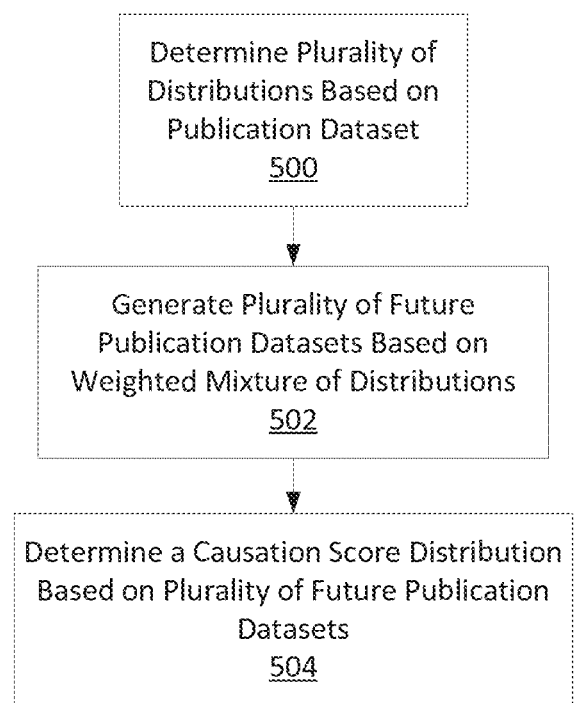
FIG. 5 illustrates an exemplary method for projecting a causation score distribution according to examples of the disclosure.

The causation score model discussed above can be extended by generating synthetic publication data for a specified time in the future and then analyzing the synthetic data using the causation score model discussed with respect to FIGS. 1A, 1B, and 2. A Monte Carlo simulation method can be employed to compute a causation score distribution based on multiple generated future publication datasets and corresponding causation scores. FIG. 5 illustrates an exemplary method for projecting a causation score distribution according to examples of the disclosure.

A plurality of distributions can be determined based on a current publication dataset (500). The current publication dataset can be sliced in a number of different ways to yield different publication distributions from which the future publication datasets can be generated—that is, each distribution may be a subset of the current publication dataset, and the distributions may overlap, in part. The plurality of distributions may include, among other possibilities: a distribution limited to publications relevant to the agent of interest, a distribution limited to publications relevant to the outcome of interest, a distribution limited to publications relevant to the agent/outcome pair of interest, and/or a distribution including every publication, whether relevant or irrelevant. Each distribution may be time limited, for example, to the last five years or some other time threshold. In some examples, an additional distribution may be limited to publications from the n years after the causation score for the agent/outcome pair crossed a causation score threshold x, where n and x are parameters that can be set based on the hypothesis.

Figure 6:
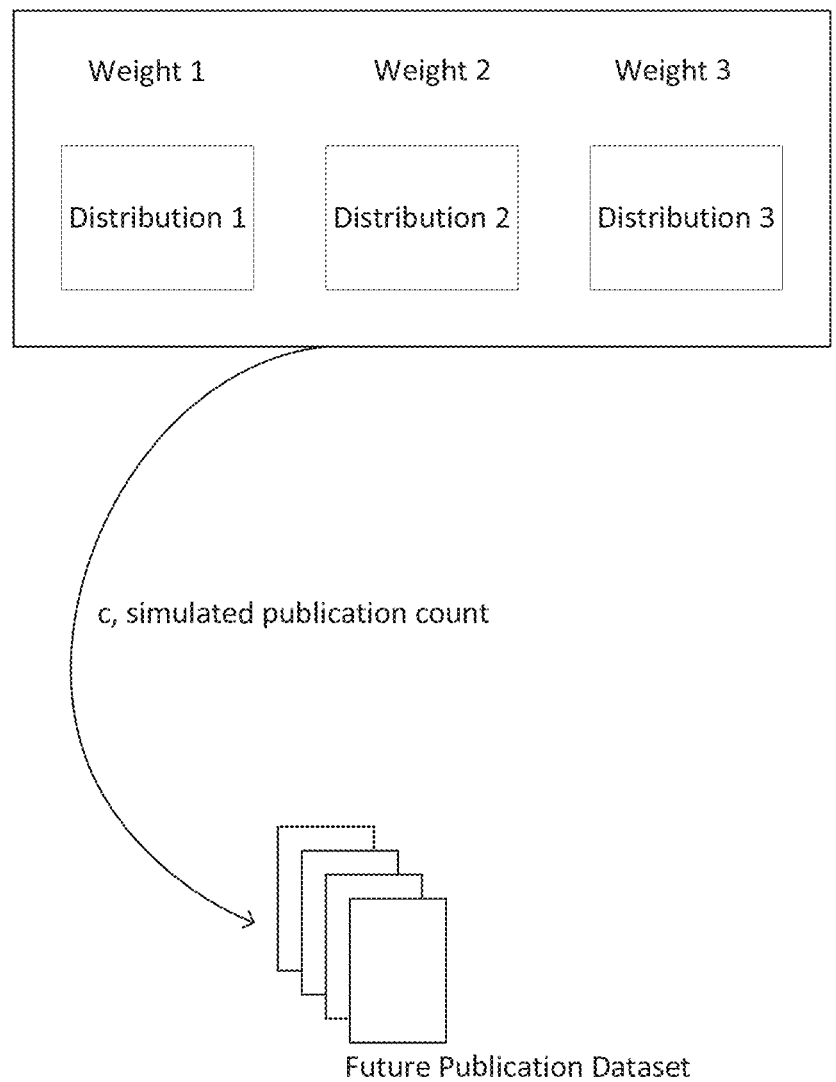
FIG. 6 illustrates an exemplary sample future publication dataset from a weighted mixture of publication distributions.

A plurality of future publication datasets may be generated from a weighted mixture of the plurality of distributions (502), and a causation score distribution may be determined based on the plurality of future publication datasets (504). FIG. 6 illustrates generation of an exemplary sample future publication dataset from a weighted mixture of publication distributions. In FIG. 6, the current publication dataset has been sliced into three different distributions, Distribution 1, Distribution 2, and Distribution 3, each having its own weight in the weighted mixture. The weighted mixture may be sampled c times, where c is a simulated publication count, the calculation of which is discussed below. When the weighted mixture is sampled, each new "publication" may simply be a copy of previously existing metadata from some article in one of the distributions, chosen randomly according to the weighted mixture model. The c samples from the weighted mixture make up a future publication dataset. In a Monte Carlo simulation, this process may be repeated a number of times to obtain a plurality of future publication datasets.

For example, in the Monte Carlo simulation, 1000 future publication datasets may be sampled from the weighted mixture of the plurality of distributions. Then, each of the 1000 future publication datasets may be analyzed by the methods described with respect to FIGS. 1A, 1B, and 2 to obtain 1000 future causation scores, each corresponding to one of the future publication datasets. The 1000 future causation scores can be aggregated and analyzed to determine the causation score distribution. For example, a median future causation score can be determined, and one or more confidence intervals can be determined based on the future causation scores. Although this example is discussed with reference to a 1000-sample Monte Carlo simulation, methods described herein can be applied to any number of samples in a Monte Carlo simulation.

The number of simulated publications in a future publication dataset can be determined by predicting a future publication count. The annual publication rate for a given body of literature can be approximated as a random walk from the short term average publication rate. For example, if the current year is n and we wish to simulate the publication count for the following year n+1, the history of publication counts from year 1 to year n can be analyzed to calculate the exponential moving average $\mu$ and the variance $\sigma^2$. For year n+1, a number of samples (e.g., 3) can be taken from the distribution $N(\mu,\sigma^2)$, and the average of those samples can be used as the number of simulated publications in the year n+1. If more than one year is being simulated, this projected count can be added to the existing publication count stream, and the process can be repeated. In this way, publication counts can be simulated arbitrarily far into the future. Further, the above-described method of generating future publication datasets can be recursed on a future publication dataset to produce an additional future publication dataset for a following year, allowing future publication datasets and causation score distributions to be generated arbitrarily far into the future.

Figure 7:
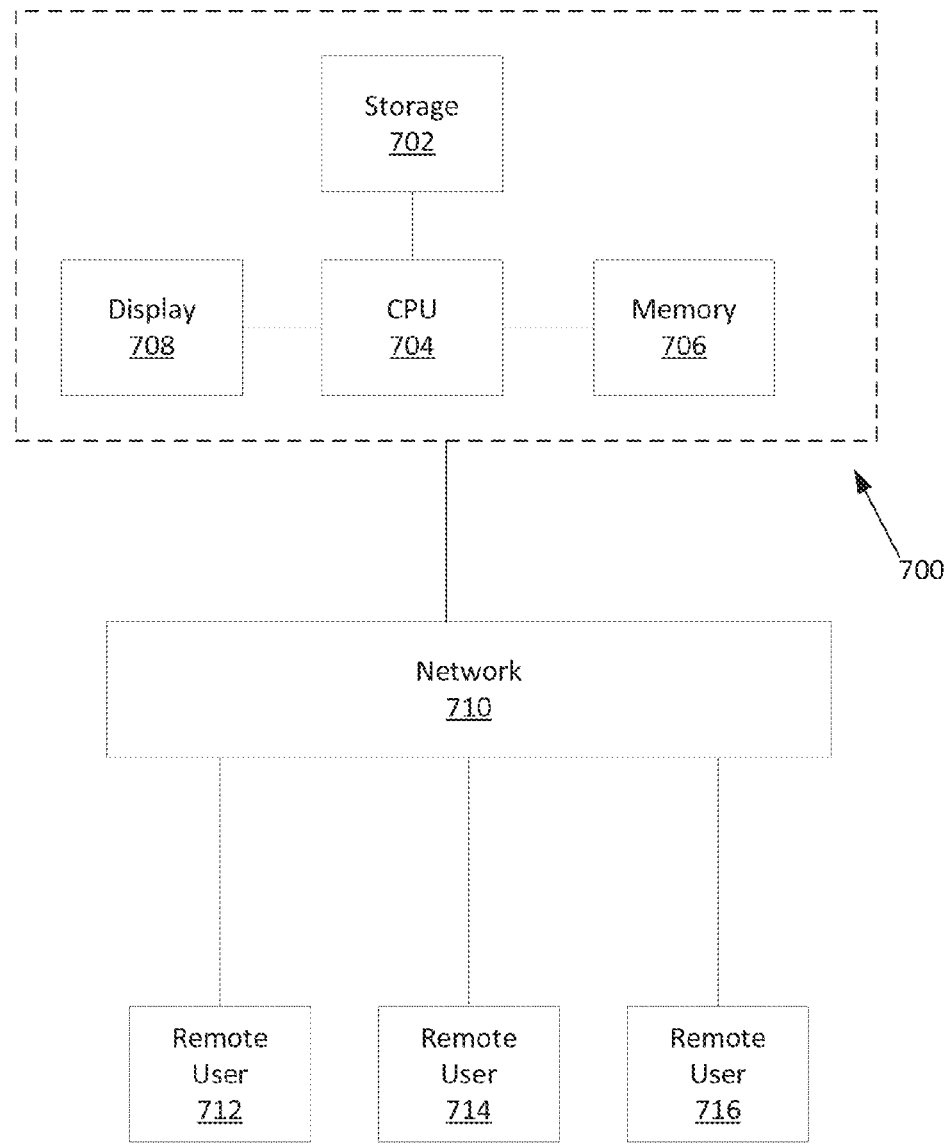
FIG. 7 illustrates an exemplary system for determining a causation score according to examples of the disclosure.

FIG. 7 illustrates an exemplary system 700 for determining a causation score and projecting a causation score distribution. The system 700 can include a CPU 704, storage 702, memory 706, and display 708. The CPU 704 can perform the methods illustrated in and described with reference to FIGS. 1A-6. Additionally, the storage 702 can store data and instructions for performing the methods illustrated and described with reference to FIGS. 1A-6. The storage can be any non-transitory computer readable storage medium, such as a solid-state drive or a hard disk drive, among other possibilities. Visualizations of the data, such as those illustrated in FIGS. 3 and 4 may be displayed on the display 708.

The system 700 can communicate with one or more remote users 712, 714, and 716 over a wired or wireless network 710, such as a local area network, wide-area network, or internet, among other possibilities. The steps of the methods disclosed herein may be performed on a single system 700 or on several systems including the remote users 712, 714, and 716.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A computer-implemented method of displaying, on a display device, a general causation visualization for an agent and an outcome, the method comprising:
   processing a corpus of scientific article metadata to obtain two subsets associated with the agent and the outcome, including a first dataset associated with a first year, and a second dataset associated with a second year;
   displaying the general causation visualization on the display device;
   displaying, in a portion of the general causation visualization associated with the first year, a representation of a first causation score computed by:
      determining a respective magnetism score for each respective article in the first dataset based on directionality data, the directionality data indicating whether the respective article supports or rejects a hypothesis that the agent causes the outcome, and evidence data, the evidence data indicating how well methodology of the article can demonstrate a causal relationship between the agent and the outcome,
      aggregating the respective magnetism scores for the articles in the first dataset to obtain a magnetism score for the first dataset,
      determining a proximity score by aggregating respective proximity categorizations of each article in the first dataset, each respective proximity categorization indicating directness of evidence in each respective article,
      weighting the magnetism score based on the proximity score, and
      computing the first causation score based on the weighted magnetism score; and
   displaying, in a portion of the general causation visualization associated with the second year, a representation of a second causation score computed based on the second dataset associated with the second year.

2. The method of claim 1, wherein the first dataset further includes magnitude data, the magnitude data indicating strength of association between the agent and the outcome as observed in an associated article, the method further comprising:
   determining a magnitude score based on the magnitude data, wherein the first causation score is further based on the magnitude score.

3. The method of claim 2, wherein the magnitude data includes an odds ratio, and determining the magnitude score includes multiplying the odds ratio by another value.

4. The method of claim 1, wherein the first dataset further includes literature impact data, and the magnetism score is further based on the literature impact data.

5. The method of claim 4, wherein the literature impact data is determined independent of the agent and the outcome.

6. The method of claim 1, further comprising:
   determining a coherence score based on the directionality data and the proximity data, wherein the first causation score is further based on the coherence score.

7. The method of claim 6, the method further comprising:
   calculating a test statistic of aggregated proximity categorizations for articles in the first dataset, wherein the coherence score is determined based on the calculated test statistic.

8. The method of claim 1, wherein aggregating the respective magnetism scores for the articles in the first dataset includes aggregating the product of respective evidence data and respective directionality data for each respective article in the first dataset.

9. The method of claim 1, wherein the evidence data includes a categorization of a methodology of the respective article, the method further comprising:
   selecting an evidence data value associated with the categorization.

10. The method of claim 1, wherein each respective proximity categorization categorizes the respective article as at least one of a human study, an animal study, and an in vitro study.

11. The method of claim 1, wherein the general causation visualization includes a graph of causation score as a function of time, the graph including the representation of the first causation score and the representation of the second causation score.

12. The method of claim 1, wherein processing the corpus of scientific article metadata includes:
    obtaining the first dataset including article metadata within a time threshold of the first year; and
    obtaining the second dataset including article metadata within the time threshold of the second year.

13. A non-transitory computer readable storage medium storing instructions executable to perform a method of displaying, on a display device, a general causation visualization for an agent and an outcome, the method comprising:
    processing a corpus of scientific article metadata to obtain two subsets associated with the agent and the outcome, including a first dataset associated with a first year, and a second dataset associated with a second year;
    displaying the general causation visualization on the display device;
    displaying, in a portion of the general causation visualization associated with the first year, a representation of a first causation score computed by:
        determining a respective magnetism score for each respective article in the first dataset based on directionality data, the directionality data indicating whether the respective article supports or rejects a hypothesis that the agent causes the outcome, and evidence data, the evidence data indicating how well methodology of the article can demonstrate a causal relationship between the agent and the outcome,
        aggregating the respective magnetism scores for the articles in the first dataset to obtain a magnetism score for the first dataset,
        determining a proximity score by aggregating respective proximity categorizations of each article in the first dataset, each respective proximity categorization indicating directness of evidence in each respective article,
        weighting the magnetism score based on the proximity score, and
        computing the first causation score based on the weighted magnetism score; and
    displaying, in a portion of the general causation visualization associated with the second year, a representation of a second causation score computed based on the second dataset associated with the second year.

14. The non-transitory computer readable storage medium of claim 13, wherein the first dataset further includes magnitude data, the magnitude data indicating strength of association between the agent and the outcome as observed in an associated article, the method further comprising:
    determining a magnitude score based on the magnitude data, wherein the first causation score is further based on the magnitude score.

15. The non-transitory computer readable storage medium of claim 14, wherein the magnitude data includes an odds ratio, and determining the magnitude score includes multiplying the odds ratio by another value.

16. The non-transitory computer readable storage medium of claim 13, wherein the first dataset further includes literature impact data, and the magnetism score is further based on the literature impact data.

17. The non-transitory computer readable storage medium of claim 16, wherein the literature impact data is determined independent of the agent and the outcome.

18. The non-transitory computer readable storage medium of claim 13, the method further comprising:
    determining a coherence score based on the directionality data and the proximity data, wherein the first causation score is further based on the coherence score.

19. The non-transitory computer readable storage medium of claim 18, the method further comprising:
    calculating a test statistic of aggregated proximity categorizations for articles in the first dataset, wherein the coherence score is determined based on the calculated test statistic.

20. The non-transitory computer readable storage medium of claim 13, wherein aggregating the respective magnetism scores for the articles in the first dataset includes aggregating the product of respective evidence data and respective directionality data for each respective article in the first dataset.

21. The non-transitory computer readable storage medium of claim 13, wherein the evidence data includes a categorization of a methodology of the respective article, the method further comprising:
    selecting an evidence data value associated with the categorization.

22. The non-transitory computer readable storage medium of claim 13, wherein each respective proximity categorization categorizes the respective article as at least one of a human study, an animal study, and an in vitro study.

23. The non-transitory computer readable storage medium of claim 13, wherein the general causation visualization includes a graph of causation score as a function of time, the graph including the representation of the first causation score and the representation of the second causation score.

24. The non-transitory computer readable storage medium of claim 13, wherein processing the corpus of scientific article metadata includes:
    obtaining the first dataset including article metadata within a time threshold of the first year; and
    obtaining the second dataset including article metadata within the time threshold of the second year.

* * * * *